2,954,349

NEUTRAL FILTER FOR NEAR ULTRAVIOLET, VISIBLE, AND NEAR INFRARED RADIATION

James R. Jenness, Jr., Southampton, Pa.
(101 W. Aaron Drive, State College, Pa.)

No Drawing. Filed Aug. 14, 1956, Ser. No. 604,048

1 Claim. (Cl. 252—300)

(Granted under Title 35, U.S. Code (1952), sec. 266)

The invention described herein may be manufactured and used by or for the Government of the United States of America for governmental purposes without the payment of any royalties thereon or therefor.

The present invention relates to a neutral filter for near ultraviolet, visible, and near infrared radiation and more particularly to a filter capable of attenuating all radiation in these wave lengths uniformly.

There are no known filters which are capable of attenuating radiation uniformly over a spectral region covering the near ultraviolet, visible and near infrared regions. Existing filters that attenuate radiation by absorbing some of the rays, absorb some wave lengths more strongly than others. Other filters rely on decreasing the intensity of radiation by using a very thin film of metal on one of the surfaces, and transmitting some wave lengths more than others because of interference between the radiation reflected at the two surfaces of the metal film.

The present invention relies on a third principle of attenuation, that of using a scattering effect within the filter material itself.

A first object of this invention is the provision of a method of producing a neutral filter material having the ability of attenuating all radiation in the near ultraviolet, visible and near infrared regions uniformly.

Another object is to provide a method of preparing a neutral filter by dispersing solid metal particles throughout a fused mass of a transparent material in such a manner that the particles remain unfused and scattered uniformly throughout said material.

Still another object is to provide a filter capable of attenuating all radiation in the near ultraviolet, visible, and near infrared regions uniformly, without attenuating some wave lengths more than others.

A final object of the present invention is the provision of a material capable of attenuating uniformly all radiation in a wide spectrum consisting of a transparent plastic material having suspended therein small metal particles scattered uniformly and not fused to the plastic medium.

The neutral filter of this invention consists of many small metal particles dispersed throughout a fused mass of polytrifluorochlorethylene plastic which is manufactured by the M. W. Kellogg Company as Kel-F. In order to prepare this filter, the powdered metal selected is first mixed with sifted fine grain plastic molding powder uniformly, then the powder mixture is fused to form a thin plastic sheet by the conventional technique for forming Kel-F sheets between stainless steel or ferro type plates. As the Kel-F powder fuses at about 500° F., which is below the fusion temperature of the metal, the metal remains as small particles suspended in the plastic material. These particles act to scatter uniformly radiation of all wave lengths which are much smaller than the particle size, avoiding diffraction effects, as is understood in the art. The amount of attenuation depends on the proportion of metal to plastic. A sufficiently high concentration of metal powder will produce an opaque plastic, while lower concentrations will give a partially transmitting material. In any case, the spectral transmittance of the plastic is multiplied by a constant factor less than one throughout the spectral region wherein the plastic is transparent.

One example of a neutral filter manufactured by the method described above would be a 1/32 inch thick sheet formed by fusing a mixture of 90 percent Kel-F powder and 10 percent powdered nickel metal by weight. Tests show that the filter produced of this proportion and technique transmits approximately 50 percent of all radiation in the spectral region from near ultraviolet through the visible and near infrared, over which region the Kel-F plastic is transparent.

In order to vary the amount of attenuation, the proportions between the Kel-F material and the powdered metal would be varied with an increase in the weight or proportion of the metal material causing an increase in attenuation and a decrease in the amount of light passed therethrough. A suitable range of values for the powdered metal would be from 2 to 12 percent by weight for a range of attenuation covering most applications.

In carrying out the above invention, any metal powder may be used provided that the metal does not fuse at the temperatures up to which the plastic or other transparent medium selected must be taken in order to be formed. The metal powder can be dispersed through transparent plastic materials other than the Kel-F chosen for the example above. If infrared transmittance is not required, another material such as methyl methacrylate (Plexiglas or Lucite) might be used. Thus by the proper selection of metals and plastic medium it is possible to prepare a neutral filter which is suitable for the particular range of use and application desired.

Obviously many modifications and variations of the present invention are possible in the light of the above teachings. It is, therefore, to be understood that within the scope of the appended claim the invention may be practiced otherwise than as specifically described.

What is claimed is:

A neutral filter for transmitting radiation within the range of near ultraviolet, visible, and near infrared, comprising: about 98 to 88 percent by weight of a carrier of plastic material transparent to the range of the radiation, and respectively about 2 to 12 percent by weight of metal particles of size much larger than the largest radiation wavelength; said particles being evenly dispersed throughout said carrier whereby the radiation is uniformly diffused and fractionally transmitted therethrough.

References Cited in the file of this patent

UNITED STATES PATENTS

| | | |
|---|---|---|
| 1,521,055 | Tesse | Dec. 30, 1924 |
| 1,521,056 | Tesse | Dec. 30, 1924 |
| 2,367,446 | Strobino | Jan. 16, 1945 |
| 2,386,855 | Horback | Oct. 16, 1945 |
| 2,400,091 | Alfthan | May 14, 1946 |
| 2,472,680 | Pratt | June 7, 1949 |
| 2,533,196 | Pace | Dec. 5, 1950 |
| 2,730,597 | Podolsky | Jan. 10, 1956 |
| 2,736,665 | Rogers | Feb. 28, 1956 |
| 2,824,060 | White | Feb. 18, 1958 |
| 2,863,788 | Vartanian | Dec. 9, 1958 |